No. 677,686. Patented July 2, 1901.
J. McLOUGHLIN.
BLOWPIPE.
(Application filed Feb. 7, 1901.)

(No Model.) 2 Sheets—Sheet 1.

WITNESSES:
Edward Thorpe
Theo. G. Hoster

INVENTOR
John McLoughlin
BY Munn
ATTORNEYS

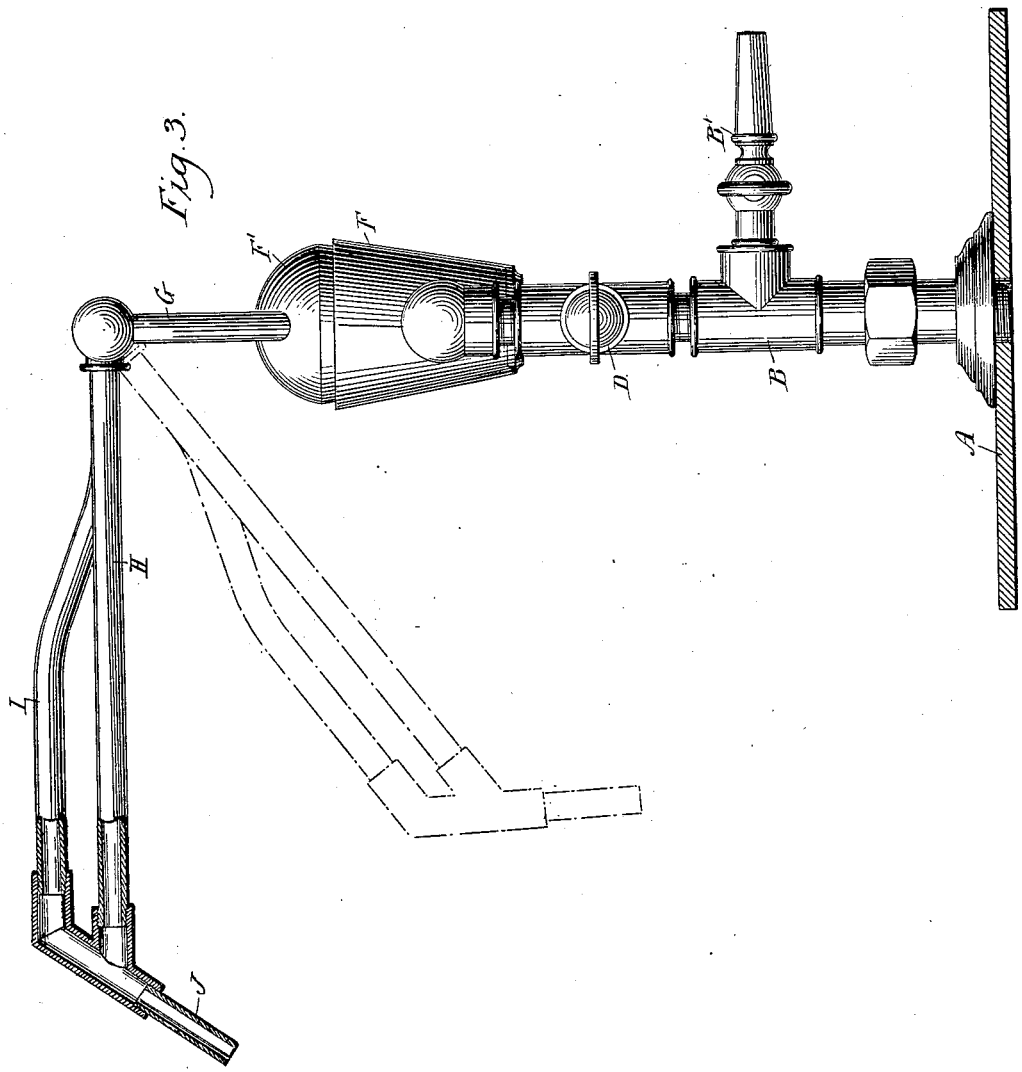

UNITED STATES PATENT OFFICE.

JOHN McLOUGHLIN, OF BOSTON, MASSACHUSETTS.

BLOWPIPE.

SPECIFICATION forming part of Letters Patent No. 677,686, dated July 2, 1901.

Application filed February 7, 1901. Serial No. 46,378. (No model.)

*To all whom it may concern:*

Be it known that I, JOHN MCLOUGHLIN, a citizen of the United States, and a resident of Boston, in the county of Suffolk and State of Massachusetts, have invented a new and Improved Blowpipe, of which the following is a full, clear, and exact description.

The object of the invention is to provide a new and improved blowpipe for use in laboratories, factories, and the like, and which is simple and durable in construction, quickly and conveniently adjusted to bring the flame to the desired point on the work, and arranged to permit the operator to use both hands freely for the work in hand.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 2:
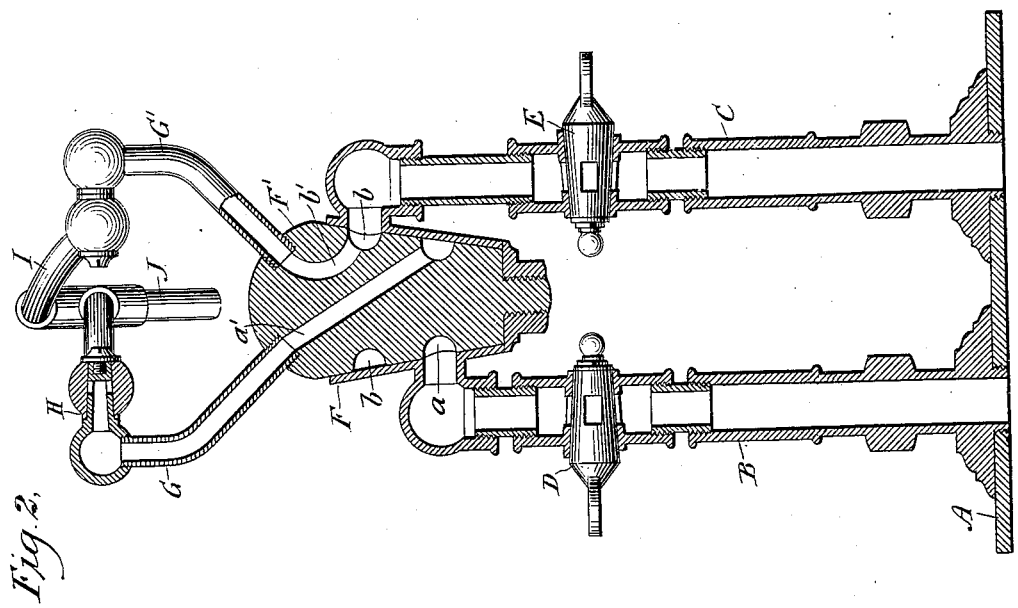
Figure 1:
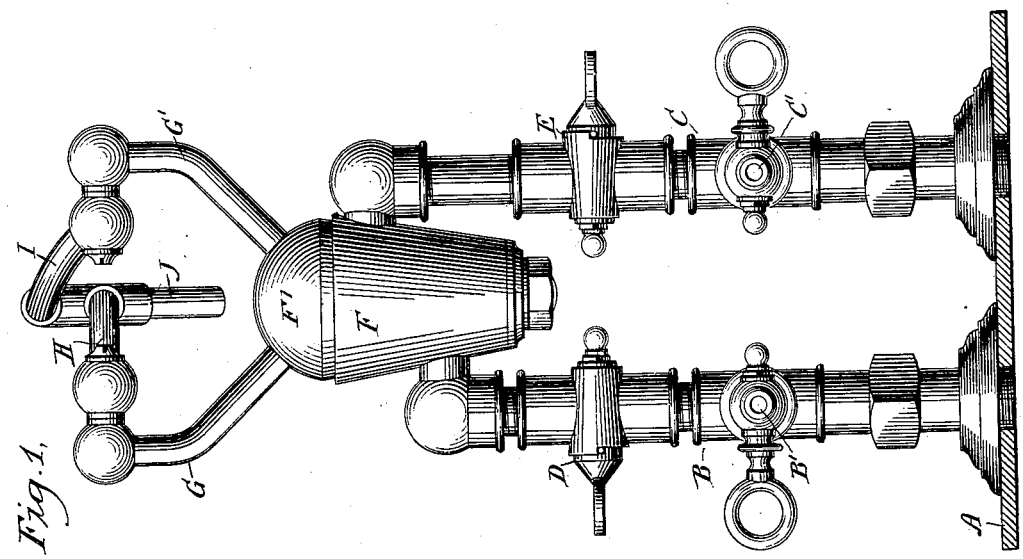

Figure 1 is a rear end elevation of the improvement. Fig. 2 is a cross-section of the same, and Fig. 3 is a side elevation of the same.

The improved blowpipe is mounted on a suitably-constructed base A, on which are secured pipes B and C, connected at their lower ends with an air-supply and a gas-supply, respectively, said pipes also having inlets B' C' for connecting the pipes B and C with an air-supply and a gas-supply, respectively, by the use of hose or the like, the inlets B' C' being provided with valves $B^2 C^2$, respectively. The pipes B and C are provided with regulating-valves D and E, under the control of the operator, and the upper ends of said pipes rigidly support a valve-casing F, in which is mounted to turn a valve-plug F', disposed vertically, as is plainly illustrated in the drawings. The valve-plug F' is formed with annular ports $a$ and $b$, of which the port $a$ is at all times in register with the air-supply pipe B, while the other port $b$ is at all times in register with the gas-supply pipe C.

From the ports $a$ and $b$ lead channels $a' b'$, respectively, opening into the feed-pipes G G', secured to the outer end of the valve-plug F', so as to turn with the same. The upper ends of the feed-pipes G G' have swivel connections with pipes H and I, opening into a blowpipe-nozzle J, extending at an angle to said pipes H and I, as is plainly indicated in Fig. 3.

The axis of the swivel connection between the pipes G G' and the pipes H and I extends horizontally in a vertical plane, passing through the axis of the valve-plug F', the latter and the said swivel connection forming a universal joint for bringing the blowpipe-nozzle J into any desired position to throw the flame issuing from the nozzle to the desired point on the work in hand. It is understood that the nozzle J, with its pipes H and I, is free to swing up and down, while a turning motion can be given to the plug F', so that the nozzle assumes the desired position. At the same time the valve-plug F' is at all times in full register with the supply-pipes B and C, so that the proper amount of air and gas passes to the nozzle, it being understood that the amount of air and gas passing to the nozzle is regulated by the operator turning the valves D and E correspondingly to insure a proper mixture of air and gas. By the arrangement described the nozzle J will stand at any position in which it is placed by the operator manipulating the universal joint, so that the operator can use both hands for the work after the nozzle is adjusted to direct the flame to the desired point on the work.

It is understood that the friction in the swivel connection is sufficient to hold the nozzle J in the desired position after the nozzle has been adjusted, as above mentioned.

Having thus fully described my invention, I claim as new and desire to secure by Letters Patent—

1. A blowpipe, comprising a casing, gas and air supply pipes connected with the casing, a revoluble body mounted in the casing and provided with ports, one registering with the gas and the other with the air supply pipe, and a swinging nozzle carried by the body and connected with the ports thereof, as set forth.

2. A blowpipe, comprising a nozzle having air and gas supply pipes, a valve mounted to turn and register at all times with the gas and air supply pipes, and a connection carried by the valve and on which the said pipes are mounted to swing, said valve and connection independently connecting said pipes with the gas and air supply, as set forth.

3. A blowpipe having a valve-casing connected with a gas-supply and an air-supply, a valve-plug turnable in said casing and having ports for connection at all times with said supplies, and a blowpipe-nozzle mounted to swing on said valve-plug and having connection with the ports thereof, as set forth.

4. A blowpipe, comprising a valve-casing provided with air and gas supply ports arranged in different planes, a valve-plug mounted to turn in the casing and having annular ports, one registering with the air-port and the other with the gas-port, and independent channels leading from the said annular ports, feed-pipes secured to said valve-plug and opening into said channels, a blowpipe-nozzle, and pipes connected with said nozzle and having a swivel connection with the feed-pipes, as set forth.

In testimony whereof I have signed my name to this specification in the presence of two subscribing witnesses.

JOHN McLOUGHLIN.

Witnesses:
JAMES H. RUSH,
MABEL F. WEBB.